H. A. LACERDA.
LUBRICATING PACKING.
APPLICATION FILED OCT. 17, 1917.
1,347,388.
Patented July 20, 1920.
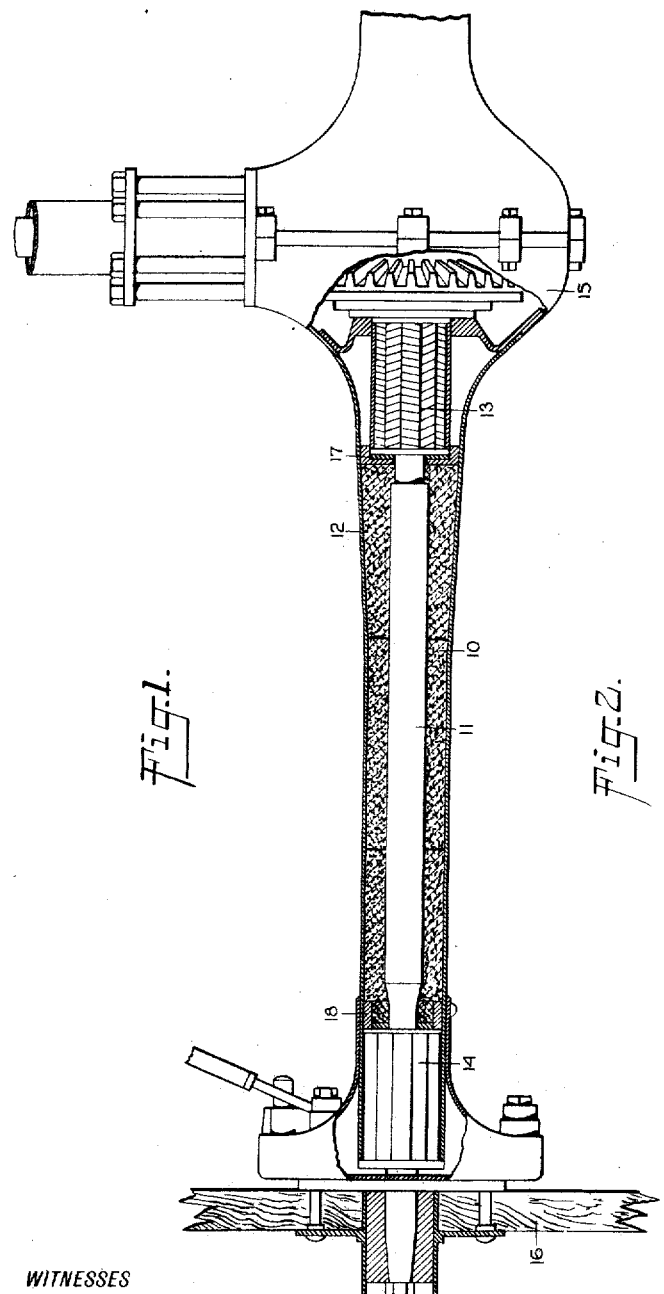
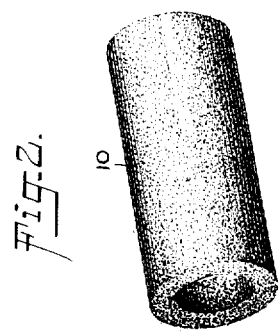
WITNESSES
William P. Goebel
Geo. G. Hosler
INVENTOR
Harry A. Lacerda
BY
ATTORNEYS

UNITED STATES PATENT OFFICE.

HARRY A. LACERDA, OF SCHENECTADY, NEW YORK, ASSIGNOR OF ONE-HALF TO RALPH W. BENSON, OF NEW YORK, N. Y.

LUBRICATING-PACKING.

1,347,388.  Specification of Letters Patent.  Patented July 20, 1920.

Application filed October 17, 1917. Serial No. 197,068.

*To all whom it may concern:*

Be it known that I, HARRY A. LACERDA, a citizen of the United States, and a resident of Schenectady, in the county of Schenectady and State of New York, have invented a new and Improved Lubricating-Packing, of which the following is a full, clear, and exact description.

The invention relates to automobiles, auto-trucks and similar vehicles, having a rear axle housing through which extends the rear or driving axle.

The object of the invention is to provide a new and improved lubricating packing filling the spaces between the rear axles and the rear axle housings intermediate the inner and outer roller bearings, and capable of preventing the lubricant within the gear casing from leaking out through the outer ends of the housings and onto the tires to the detriment thereof. Another object is to retain the grease or other lubricating medium within the differential gear housing thus preventing waste of such lubricant.

In order to accomplish the desired result, use is made of a packing filling each rear axle housing intermediate the inner and outer roller bearings and in contact with the rear axle, the packing having lubricating qualities and anti-grease absorbing qualities, and being compressible to allow of tightly packing it in position in the housing.

A practical embodiment of the invention is represented in the accompanying drawings forming a part of this specification, in which similar characters of reference indicate corresponding parts in both views.

Figure 1 is a sectional plan view of the packing in position in the housing of a rear axle of a Ford car, part of which is shown in elevation and part in section; and Fig. 2 is a perspective view of the packing.

It is well known that in automobiles of the Ford and other types the lubricant within the differential gear casing gradually works out by way of the left and right rear axle housings and drops onto the tires to the detriment thereof. In order to prevent this lubricant from leaving the gear casing by way of the axle housings, use is made of a packing 10, preferably of cylindrical shape and having lubricating and anti-grease absorbing qualities, at the same time being of a compressible texture to permit of tightly packing the packing around the rear axle 11 within the annular space between the axle 11 and the axle housing 12. By reference to Fig. 1, it will be noticed that the packing 10 extends from the inner roller bearing 13 to the outer roller bearing 14, and as the said packing completely fills the space between the axle 11 and the axle housing 12 it is evident that the lubricant contained within the gear casing 15 cannot work out by way of the housing 12 and drop onto the tires of the rear wheel 16.

It is understood that although the roller bearings 13 and 14 are provided with the usual felt or similar packing devices 17 and 18 such devices do not prevent the escape of the lubricant from the gear casing 15 by way of the rear axle housing 12, but by filling the space in the axle housing 12 between the roller bearings 13 and 14 the lubricant is prevented from leaking out especially as the packing 10 has anti-grease absorbing qualities and at the same time the packing has lubricating qualities thus insuring an easy running of the rear axle 11 in the packing 10.

In order to apply the packing, the wheel 16 is removed, and then the roller bearing 14 is pulled out together with the washers 18. The tubular packing 10 is now slipped over the outer end of the axle 11 and pushed inward until it abuts against the washers 17 of the inner roller bearing 13. The packing 10 is made in sections and such sections are slipped one after the other onto the axle 11 and pushed inward and pressed to completely fill the housing 12, after which the roller bearing 14 is replaced and likewise the wheel 16.

It is understood that the packing 10 is of such length that two or three sections are sufficient to completely fill the axle housing 12, as indicated in Fig. 1.

The lubricating packing is principally composed of about 70% tallow, 25% fixed oil and 5% animal fats, and these ingredients owing to their fatty nature do not absorb the lubricant in the gear casing and hence the lubricant is retained in the gear casing.

Having thus described my invention, I claim as new and desire to secure by Letters Patent:—

In a vehicle having a driving axle, a housing through which extends the driving axle, and a bearing at each end of said driving axle, a tubular packing filling the annular space between the axle and the housing, said packing being made in short sections and pliable to permit of tightly packing it in said annular space so as to completely fill said space from one bearing to the other, said packing having lubricating qualities to lubricate the axle and being of a fatty nature so as to resist the flow of a lubricating medium.

HARRY A. LACERDA.